March 4, 1941.    A. GIROUARD    2,233,698
DETACHABLE NOSE SHIELD FOR SUNGLASSES OR THE LIKE
Filed July 23, 1938
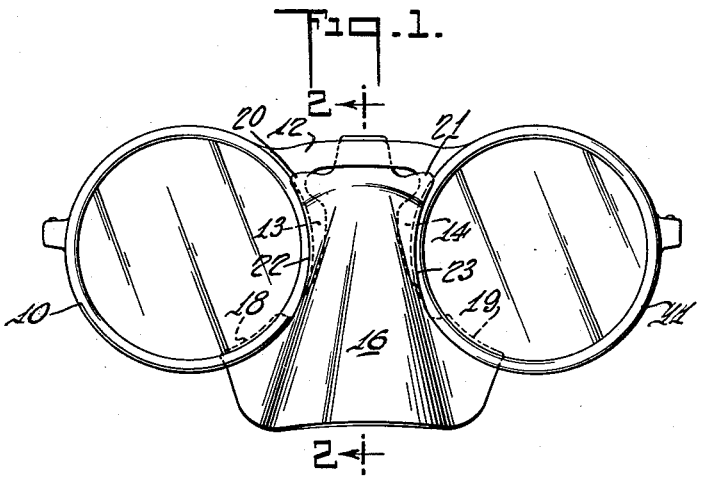
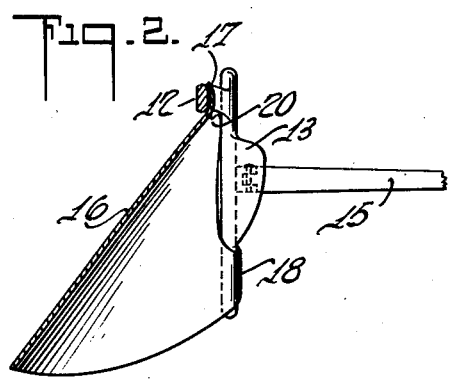
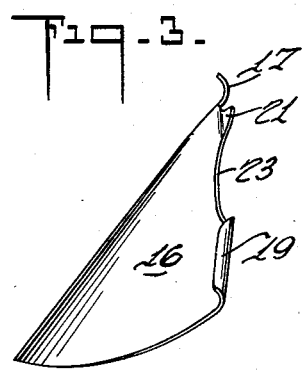
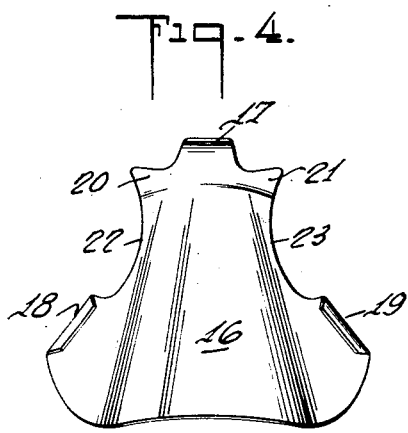
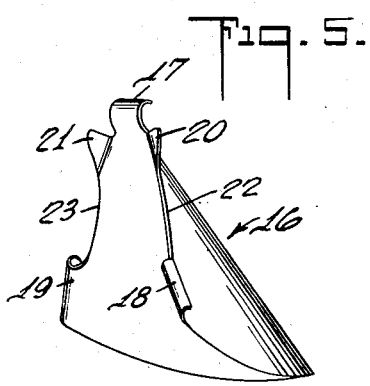
INVENTOR
Albert Girouard.
BY
ATTORNEY Patented Mar. 4, 1941

2,233,698

UNITED STATES PATENT OFFICE 2,233,698

DETACHABLE NOSE SHIELD FOR SUNGLASSES OR THE LIKE

Albert Girouard, Leominster, Mass., assignor to Fosgood Corporation, Leominster, Mass., a corporation of Massachusetts Application July 23, 1938, Serial No. 220,903

1 Claim. (Cl. 2—206)

This invention relates to a removable nose shield for use with rimmed eyeglass or sunglass frames whereby the wearer's nose is protected from the sun or wind. The shield may be used with any size frame that has a bridge portion.

An object of this invention is to provide a nose shield that is easily snapped into and removed from position and is firmly retained in its operative position.

Another object is to provide an inherently flexible nose shield that is snapped into and retained in position by its inherent flexibility.

Other obvious advantages of this invention will become apparent as the description proceeds.

I do not wish to be limited to the exact shape, size and structural details as here disclosed, but mean this disclosure to be representative only of the invention. Any equivalent structure as may fall within the scope of the appended claim are meant to be included.

In the drawing:

Figure 1 is a front elevation view of rimmed eyeglass frames with a raised bridge portion showing the nose shield snapped in position on the frame;

Fig. 2 is a sectional view on the line 2—2 of Figure 1;

Fig. 3 is a side elevation view of the nose shield removed from the eyeglass frame.

Fig. 4 is a front elevation view of Fig. 3; and

Fig. 5 is a perspective view of the nose shield.

The usual rimmed eyeglass frame is shown in Figure 1 and has the glass retaining rims 10, 11, interconnecting bridge member 12, nose saddles 13, 14 and temples 15.

The nose shield 16 is constructed of cellulose composition or any plastic material that will give inherent flexibility to it. It may be made transparent, translucent or opaque and in any suitable color to afford the desired degree of protection to the wearer.

It is constructed curved and flaring and generally nose shaped, as best seen in Fig. 5. The rear portion has three forwardly curving hooks 17, 18 and 19 all arranged as shown.

Limiting stop members 20 and 21 are arranged at opposite sides of hook 17 and tend to flex in the rearward direction.

Member 17 hooks on the rear of bridge 12 and members 18 and 19 hook to the lower part of the eyeglass rims.

The stop members 20, 21 contact the upper part of the rims at the outside.

Between hook 18 and stop 20 and between hook 19 and stop 21 are cut out portions 22, 23 to straddle the nose saddles 13 and 14 and thereby prevent interference with the normal wearing of the glasses.

The hooks 17, 18, 19 and stops 20, 21 act flexibly in opposite directions upon the rims 10, 11 and bridge 12 to securely retain the nose shield in position.

It is to be noted that this shield structure may be used on any rimmed eyeglass frame in which the bridge portion 12 is adapted to act also as the nose saddle to support the glasses on the wearer. This is evident from the fact that the side saddles on the side-saddle type frame do not function in any way to retain the shield in position and the elimination of these side saddles would not alter the positioning of the shield.

I claim:

A nose shield for use with a pair of sunglasses having a nose bridge and lens rims, comprising a shield shaped to conform substantially to the contour of the nose, said shield having an upwardly and forwardly curved lip extending from its upper end positioned to engage the rear surface of the nose bridge, a pair of arms extending laterally from the upper end of the shield at the base of the lip and having rear lens rim engaging faces positioned to engage over the front surface of the nose bridge and lens rims, and a pair of supporting members extending from the sides of the shield and engaging the rims of the glasses, said lip, arms, and supporting members cooperating to support the shield in inclined position.

ALBERT GIROUARD.